(12) United States Patent
Duguey et al.

(10) Patent No.: US 9,647,600 B2
(45) Date of Patent: May 9, 2017

(54) DEVICE FOR CONTROLLING A POLYPHASE INVERTER

(71) Applicant: VALEO EQUIPMENTS ELECTRIQUES MOTEUR, Creteil (FR)

(72) Inventors: Jean-Francois Duguey, Cachan (FR); Gilbert Konan, Creteil (FR); Francois-Xavier Bernard, Creteil (FR); Daniel Pereira, Fresnes (FR); Laurent Domenger, Choisy le Roi (FR); Abdelaziz Azizi Samir, Thiais (FR); Son Ha Tran, Creteil (FR)

(73) Assignee: Valeo Equipement Electriques Moteur, Creteil (FR)

( * ) Notice: Subject to any disclaimer, the term of this patent is extended or adjusted under 35 U.S.C. 154(b) by 29 days.

(21) Appl. No.: 14/782,410

(22) PCT Filed: Apr. 3, 2014

(86) PCT No.: PCT/FR2014/050800
§ 371 (c)(1),
(2) Date: Dec. 30, 2015

(87) PCT Pub. No.: WO2014/162101
PCT Pub. Date: Oct. 9, 2014

(65) Prior Publication Data
US 2016/0141997 A1    May 19, 2016

(30) Foreign Application Priority Data

Apr. 5, 2013 (FR) ..................... 13 53099

(51) Int. Cl.
*G05F 1/70* (2006.01)
*H02P 27/08* (2006.01)
(Continued)

(52) U.S. Cl.
CPC .............. *H02P 27/08* (2013.01); *H02P 21/22* (2016.02); *H02P 25/22* (2013.01); *H02M 7/493* (2013.01);
(Continued)

(58) Field of Classification Search
CPC .. H02P 25/00; H02P 1/24; H02P 27/00; H02P 1/42; H02P 1/26; H02P 27/08
(Continued)

(56) References Cited

U.S. PATENT DOCUMENTS 5,298,848 A * 3/1994 Ueda ................... H02M 5/4505
318/801
2010/0072928 A1    3/2010 Welchko

FOREIGN PATENT DOCUMENTS

FR    2 895 598 A1    6/2007
JP    2001-197779 A    7/2001
JP    2008-092739 A    4/2008

OTHER PUBLICATIONS

International Search Report issued in corresponding application No. PCT/FR2014/050800 mailed Aug. 8, 2014 (2 pages).
(Continued)

*Primary Examiner* — Antony M Paul
(74) *Attorney, Agent, or Firm* — Osha Liang LLP (57) ABSTRACT

The device according to the invention controls a polyphase inverter (10, 14, 17) intended for powering from a DC current source (CC) a polyphase rotating electric machine (1). The device is of the type of those generating commutation functions driving commutation elements (9, 13) of the inverter in such a way as to obtain a reduction of the losses in the commutation elements and a decrease of an effective current in a decoupling capacitor (16) of the source (CC). According to the invention, this reduction and this decrease are obtained by means of a set of control strategies (21, 24)
(Continued)

determining the commutation functions by using additional degrees of freedom of the polyphase machine (1) with respect to a three-phase reference machine. The polyphase machine comprises first and second phase windings forming a first three-phase system (2, 3, 4) and a second three-phase system (5, 6, 7) with distinct neutral points (11, 15) offset angularly by a predetermined angle of offset (Θ). The first and second phase windings are linked respectively to three first and three second power arms (8, 12) formed by the commutation elements.

8 Claims, 4 Drawing Sheets

(51) Int. Cl.
*H02P 21/22* (2016.01)
*H02P 25/22* (2006.01)
*H02M 7/493* (2007.01)

(52) U.S. Cl.
CPC .... *H02P 2207/076* (2013.01); *H02P 2209/13* (2013.01)

(58) Field of Classification Search
USPC .......... 318/729, 599, 438, 748, 139, 400.01, 318/400.02, 400.14, 400.15, 700, 701, 318/721, 779, 799, 800, 801, 727; 363/21.1, 40, 44, 95, 120, 174, 175; 322/20; 315/247
See application file for complete search history.

(56) References Cited

OTHER PUBLICATIONS

Ahmet M. Hava, et al.; "A High-Performance Generalized Discontinuous PWM Algorithm"; IEEE Transactions on Industry Applications, vol. 34, No. 5, pp. 1059-1071; Sep./Oct. 1998 (13 pages).

* cited by examiner

DEVICE FOR CONTROLLING A POLYPHASE INVERTER

TECHNICAL FIELD OF THE INVENTION

The present invention concerns a device for controlling a polyphase inverter intended to supply power from a direct current source to a double three-phase rotating electrical machine, i.e. a machine including a stator with two three-phase windings offset angularly relative to each other.

The invention also concerns a double three-phase rotating electrical machine including an integrated inverter provided with this device, notably for applications in motor vehicles.

TECHNOLOGICAL BACKGROUND OF THE INVENTION

An inverter is used to generate from a direct current source the polyphase currents necessary for a polyphase rotating electrical machine to function.

An inverter generally includes switching elements forming a plurality of power arms each including two switching elements in a classic two-level bridge architecture.

The mid-point of a pair of switching elements of the same power arm is connected to a phase winding of the stator of the rotating electrical machine.

The switching elements are most often controlled by pulse width modulation (PWM) methods making it possible to apply to the rotating electrical machine voltages between phases of sinusoidal waveform.

The space vector modulation (SVM) process is very widely used and enables an improvement of 15% to be achieved over the conventional sinusoidal PWM method.

In the prior art, there are known other types of methods of controlling a polyphase inverter, notably a generalized discontinuous pulse width modulation (GDPWM) process described for example in the paper "A High-Performance Discontinuous PWM Algorithm", A. M. Hava et al., IEEE Trans. on Industry Applications, vol. 34, no 5, September/October 1998, p. 1059-1071.

This control method blocks one of the power arms turn and turn about over an electric period.

Comparison of the various PWM methods in terms of efficiency has generated an abundant technical literature.

Studies oriented toward applications in motor vehicles include the paper "A Comparison between Pulse Width Modulation Strategies in terms of Power Losses in a Three-Phased Inverter—Application to a Starter Generator", J. Hobraiche, J. P Vilain, M. Chemin, European Power Electronics Congress—Power Electronics and Motion Control, Riga, Latvia, September 2004.

The losses in the inverter are compared for the SVM and GDPWM processes as a function of the operating points of a starter generator.

Moreover, the increase in power of the onboard equipment in the vehicles is giving rise to new problems of electromagnetic compatibility (EMC), notably in relation to conducted interference.

To stabilize a supply voltage on the upstream side of the inverter, the current source generally includes a decoupling capacitor that makes it possible to filter the input current of the inverter that is subject to a high level of discontinuities because of the chopping effected by the switching elements.

French patent application FR2895598 in the name of VALEO EQUIPEMENTS ELECTRIQUES MOTEUR describes a specific PWM control method for controlling a polyphase inverter that enables both a reduction of the switching losses and a reduction of the rms current in the decoupling capacitor so as to reduce the ripple on the supply voltage.

The PWM control method described in this application applies to polyphase electrical loads in general, whereas most of the studies, as well as the papers cited above, are limited to three-phase electrical machines.

It is known that polyphase rotating electrical machines have advantages over three-phase machines in terms of reduced oscillation of the torque in motor mode and ease of elimination of harmonics in generator mode.

There is therefore a requirement for studies bearing on PWM control in terms of reduced switching losses and reduced conducted interference for polyphase machines.

However, the increase in the number of phases leads to an increase in the complexity of a control device of the machine and the inventors have concentrated on double three-phase machines that allow simplification of the control device compared to six-phase machines in general and that authorize an extrapolation of the results of studies carried out on three-phase machines, such as those published by J. Hobraiche et al. in the paper cited above.

GENERAL DESCRIPTION OF THE INVENTION

In view of applications in the highly competitive automotive field, the object of the present invention is therefore to optimize a PWM control device.

The invention therefore concerns a device for controlling a polyphase inverter intended to supply power from a direct current source to a double three-phase rotating electrical machine, the device being of the type comprising means for generating switching signals controlling switching elements so as to obtain a reduction of losses in the switching elements and a reduction in an rms current in a decoupling capacitor of the source, the double three-phase rotating electrical machine including three first phase windings and three second phase windings forming a first three-phase system and a second three-phase system with separate neutral points offset angularly by a predetermined offset angle, and the first and second phase windings being connected to three first and three second power arms, respectively, formed by the switching elements of the polyphase inverter.

In accordance with the invention, the device also includes:

means for storing a set of at least two control strategies determining the switching signals;

means for acquiring a rotation speed and a power factor of the machine; and means for selecting a current strategy from the set of control strategies as a function of the rotation speed and the power factor.

A first strategy from the set of control strategies advantageously consists in applying to the first three-phase system a first centered vectorial pulse width modulation offset by a common delay from a second centered vectorial pulse width modulation with the same period applied to the second three-phase system.

Alternatively, a second strategy from the set of control strategies preferably consists in applying to the first three-phase system a first vectorial pulse width modulation offset by a common delay from a second vectorial pulse width modulation with the same period applied to the second three-phase system and blocking one of the three first arms and/or one of the three second arms.

As a further alternative, a third strategy from the set of control strategies preferably consists in applying to the first three-phase system a first generalized discontinuous pulse width modulation offset by a common delay from a second generalized discontinuous pulse width modulation with the same period applied to the second three-phase system.

In another alternative, a fourth strategy from the set of control strategies advantageously consists in:
- applying to the first three-phase system a first centered vectorial pulse width modulation and to the second three-phase system a second centered vectorial pulse width modulation having the same period and the same time origin;
- blocking one of the three first arms and one of the three second arms;
- offsetting the first, second and third delays relative to this time origin of the switching fronts of three of the three first arms and the three second arms that are not blocked.

The device in accordance with the invention exploits the fact that a current strategy is used that is selected from this set of control strategies as a function of an operating point of the polyphase machine.

The second strategy is preferably applied if a rotation speed of the machine is less than a first predetermined speed representative of an end of starting of the machine or if this rotation speed is between this first predetermined speed and a second predetermined speed representative of an end of functioning of the machine at constant torque greater than this first predetermined speed and if a power factor of the machine is less than or equal to a predetermined coefficient.

Alternatively, the third strategy is preferably applied if a rotation speed of the machine is between a first predetermined speed representative of an end of starting of the machine and a second predetermined speed representative of an end of functioning of the machine at constant torque greater than this first predetermined speed and if a power factor of the machine is greater than a predetermined coefficient or if this rotation speed is between this second predetermined speed and a third predetermined speed representative of operation of the machine at constant power greater than this second predetermined speed.

The invention also concerns a double three-phase rotating electrical machine including an integrated inverter provided with a control device as described briefly hereinabove.

These few essential specifications will have made evident to the person skilled in the art the advantages procured by the device in accordance with the invention for controlling a polyphase inverter and by the corresponding electrical machine, compared to the prior art.

The detailed specifications of the invention are given in the following description with reference to the appended drawings. Note that these drawings are intended only to illustrate the text of the description and do not in any way constitute a limitation on the scope of the invention.

DESCRIPTION OF PREFERRED EMBODIMENTS OF THE INVENTION

Figure 1:
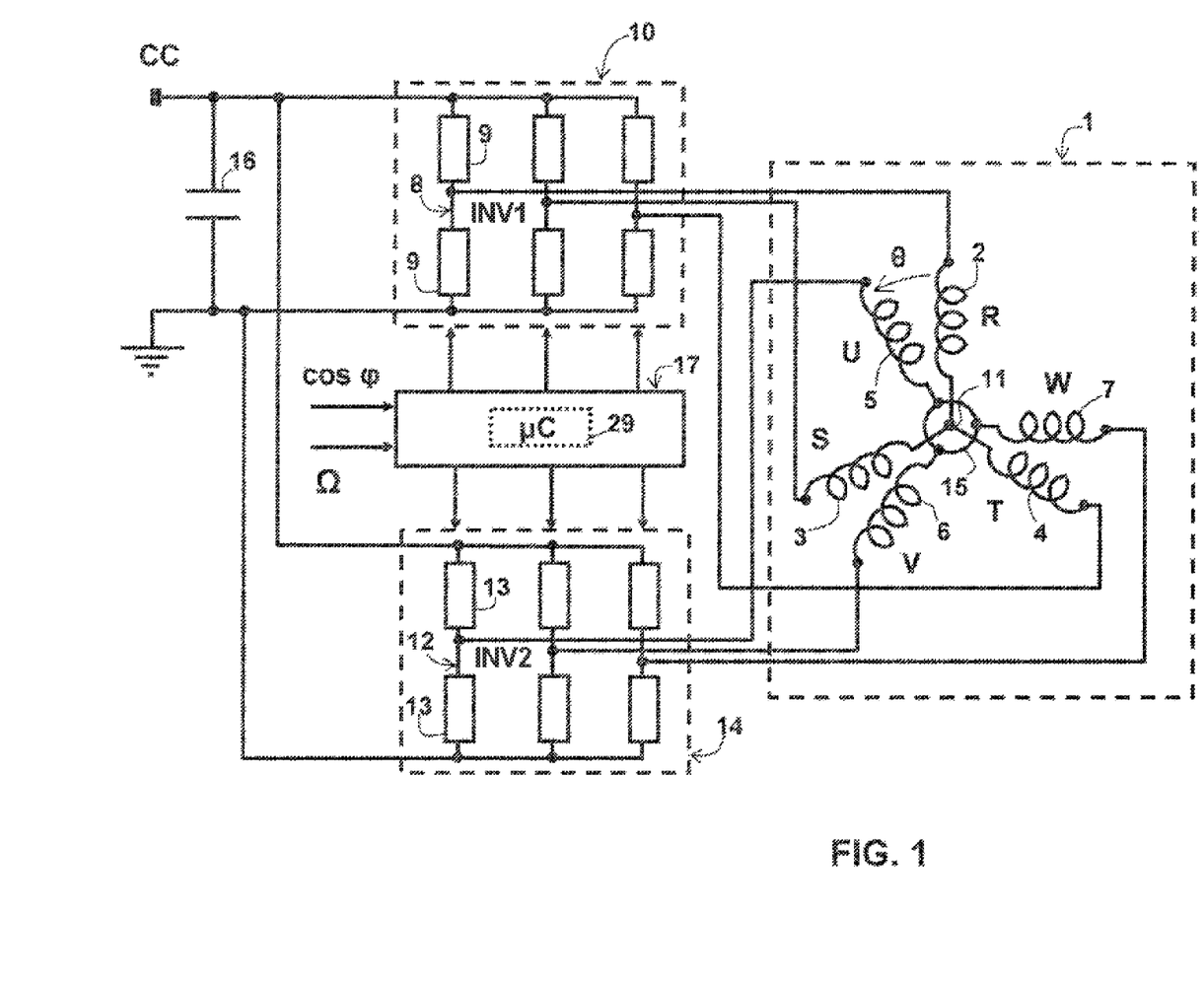
FIG. 1 shows diagrammatically a double three-phase rotating electrical machine and an inverter provided with its control device in accordance with the invention.

As the diagrammatic representation of FIG. 1 clearly shows, in a preferred embodiment of the invention the stator 1 of the double three-phase rotating electrical machine includes a star-connected first three-phase system consisting of three first phase windings 2, 3, 4 and a second star-connected three-phase system consisting of three second phase windings 5, 6, 7 offset relative to one another by an offset angle θ of 30°.

Each of the first phase windings 2, 3, 4 has a first end connected to each of the first mid-points of first power arms 8 formed by switching elements 9 of a first power module 10 and a common other first end 11.

In the same way, each of the second phase windings 5, 6, 7 has a second end connected to each of the second mid-points of second power arms 12 formed by other switching elements 13 of a second power module 14 and another common second end 15.

The common first and second ends 11, 15 are the neutral points of the first and second three-phase systems and are isolated from each other.

The first and second power arms 8, 12 of the first and second power modules 10, 14 are connected in parallel to a direct current source CC that includes a decoupling capacitor 16.

The switching elements 9, 13 are controlled by a control device 17 so as to switch first phase currents R, S, T circulating in the first phase windings 2, 3, 4 and second phase currents U, V, W circulating in the second phase windings 5, 6, 7 in accordance with control strategies implemented in the invention, making it possible to have function as a six-phase inverter the first and second power modules 10, 14 functioning as first and second three-phase inverters INV1, INV2.

In each of these first and second inverters, it is possible to block a power arm 8, 12 or not. It is also possible to offset the PWM relative to one another.

The inventors have determined that these control strategies make it possible both to reduce the switching losses in the switching elements 9, 13, most often consisting of MOS transistors, at the same time as reducing an RMS current that the decoupling capacitor 16 at the input of the inverter 10, 14 must absorb.

Four control strategies studied by the inventors by means of computer simulations based on work carried out on three-phase machines are described in detail hereinafter with reference to FIGS. 2a, 2b, 2c and 2d.

Strategy I

Figure 2A:
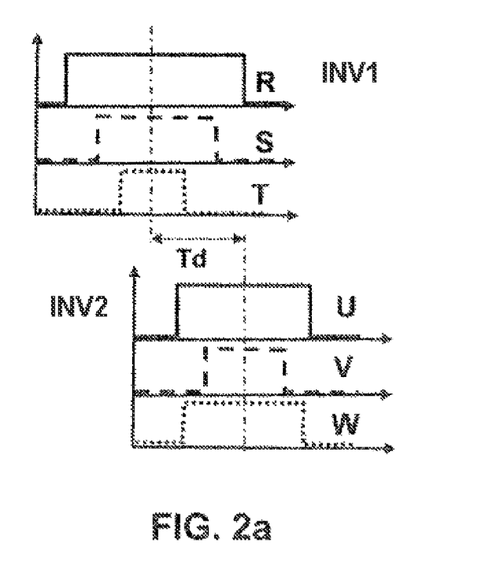
FIGS. 2a, 2b, 2c and 2d show timing diagrams of the pulse width modulation applied to the double three-phase machine, respectively resulting from first, second, third and fourth control strategies.

This first strategy consists in applying two vector PWM without blocking a power arm 8, 12.

The timing diagrams of the first phase currents R, S, T generated by the first three-phase inverter INV1 and the second phase currents U, V, W generated by the second three-phase inverter INV2 in this first strategy are shown in FIG. 2a.

A centered vector PWM (SVM) is applied to each of the two three-phase systems.

The PWM have the same period. They are separated by a constant or variable common delay Td.

Strategy II

Figure 2B:
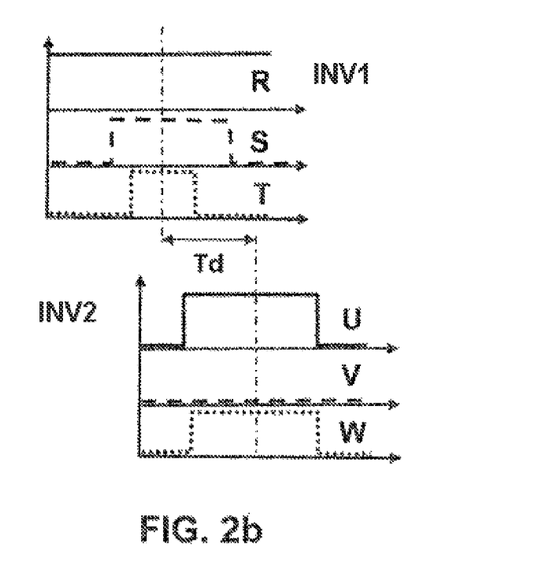

This second strategy consists in applying two vector PWM with blocking of one or both power arms 8, 12.

The timing diagrams of the first phase currents R, S, T generated by the first three-phase inverter INV1 and the second phase currents U, V, W generated by the second three-phase inverter INV2 in this second strategy are shown in FIG. 2b.

The vector PWM with an offset of the potentials of the neutral points 11, 15 make it possible to block one or two of the six power arms 8, 12 of the inverter 10, 14.

The PWM have the same period. They are separated by a constant or variable common delay Td.

Simulations have shown that the rms current in the decoupling capacitor 16 is greatly reduced when this common delay Td is 25% of the PWM period.

Strategy III

Figure 2C:
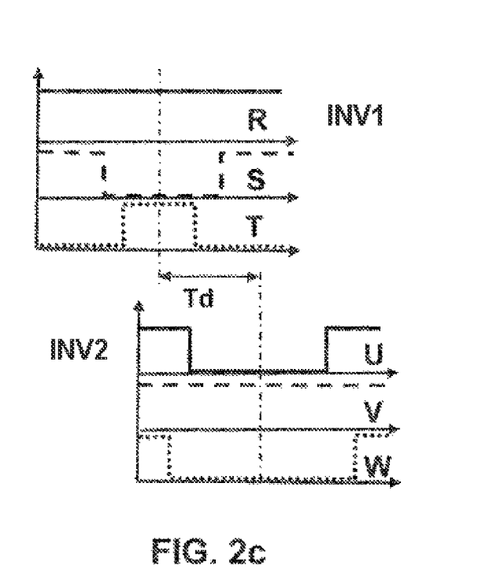

This third strategy consists in applying two generalized discontinuous PWM (GDPWM).

The timing diagrams of the first phase currents R, S, T generated by the first three-phase inverter INV1 and the second phase currents U, V, W generated by the second three-phase inverter INV2 in this third strategy are shown in FIG. 2c.

The two GDPWM are applied to each of the two three-phase systems, that is to say:

blocking in each of the two three-phase inverters INV1, INV2 of the power arm 8, 12 having a maximum current and able to be blocked;
   two of the remaining PWM are offset.

The PWM have the same period. They are separated by a constant or variable common delay Td.

Simulations have shown that the current in the decoupling capacitor 16 is greatly reduced when this common delay Td is 30% of the PWM period.

Strategy IV

Figure 2D:
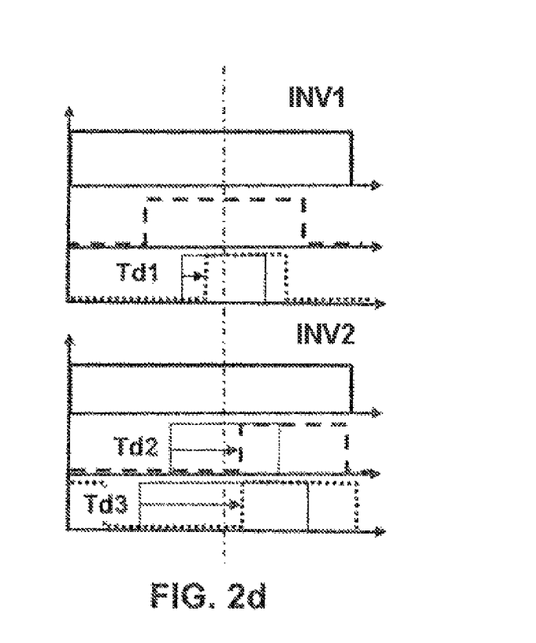

This strategy consists in applying two centered vector PWM (SVM) to offset PWM and blocked power arm 8, 12.

The timing diagrams of the first phase currents R, S, T generated by the first three-phase inverter INV1 and the second phase currents U, V, W generated by the second three-phase inverter INV2 in this fourth strategy are shown in FIG. 2d.

The PWM have the same period.

Two of the six power arms 8, 12 are blocked. Three of the four PWM are then offset by first, second and third delays Td1, Td2, Td3 the values of which are included in the range [−50%, +50%] of the PWM period.

These offsets are more general than for centered vector PWM (for which the delays are zero) and GDPWM (for which the delays equal 50°).

In accordance with the object of the invention, the control strategies described above lead to a reduction of the losses in the switching elements 9 and a reduction of the rms current in the decoupling capacitor 16.

The inventors having noted that the losses in this decoupling capacitor 16 depending on the phase difference φ between a phase current R, S, T; U, V, W and a phase voltage and the coefficient of modulation m (defined as the ratio of a peak phase voltage to half a supply voltage of the inverter), there existed an additional optimization approach through dynamically selecting a current strategy from the set of control strategies as a function of an operating point of the polyphase machine.

Figure 3:
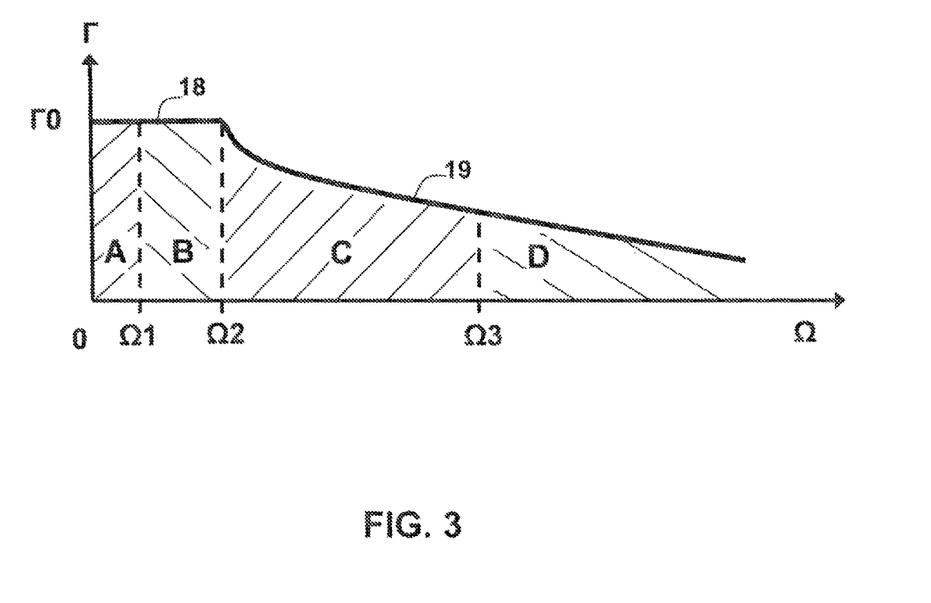
FIG. 3 shows the operating points of the double three-phase machine shown in FIG. 1 for the selection of the control strategies shown in FIGS. 2a, 2b, 2c and 2d.

The typology of the various operating points (motor torque r, rotation speed Ω) taken into account for the selection of the control strategies is indicated in FIG. 3:

Area A

This first area A corresponds to starting the double three-phase machine 1 operating at constant motor torque [0 from stopped (zero rotation speed Ω) up to a first rotation speed Ω1.

In an application of the double three-phase machine 1 as a starter generator in a motor vehicle, this first area A typically corresponds to the MOTOR mode of a STOP/START function.

The rotation speed Ω and the phase voltage of the machine 1 are low.

Area B

This second area B corresponds to a mode of operation of the machine 1 in which the rotation speed Ω is between the first rotation speed Ω1 and a second rotation speed Ω2 that marks the end 18 of operation at constant torque.

In an application of the double three-phase machine 1 to assisting acceleration in a hybrid vehicle, this second area B typically corresponds to a BOOST function.

The rotation speed Ω and the phase voltage of the machine 1 remain low, but the power factor cos φ of the machine 1 may be low for a rotation speed Ω close to the first rotation speed Ω1 or close to unity for a rotation speed Ω close to the second rotation speed Ω2.

Area C

This third area C corresponds to a mode of operation of the machine 1 in which the rotation speed Ω is between the second rotation speed Ω2 and a third rotation speed Ω3 that is representative of operation 19 at constant power.

In an application of the double three-phase machine 1 to assisting acceleration in a hybrid vehicle, this third area C typically corresponds to a BOOST function.

The rotation speed Ω and the phase voltage of the machine 1 are high, and the power factor cos φ of the machine 1 is close to unity.

Area D

This fourth area D corresponds to a mode of operation of the machine 1 in which the rotation speed Ω is greater than the third rotation speed Ω3.

In an application of the double three-phase machine 1 to assisting acceleration in a hybrid vehicle, this fourth area D typically corresponds to a BOOST function.

The rotation speed Ω of the machine 1 is very high and the phase voltage is high, and the power factor cos φ of the machine 1 is close to unity.

The rotation speed Ω of the machine 1 being very high in this fourth area D, a current strategy of PWM type is replaced by full-wave control.

This fourth area D therefore does not constitute a criterion for selection of a current strategy from the control strategies in accordance with the invention.

Figure 4:
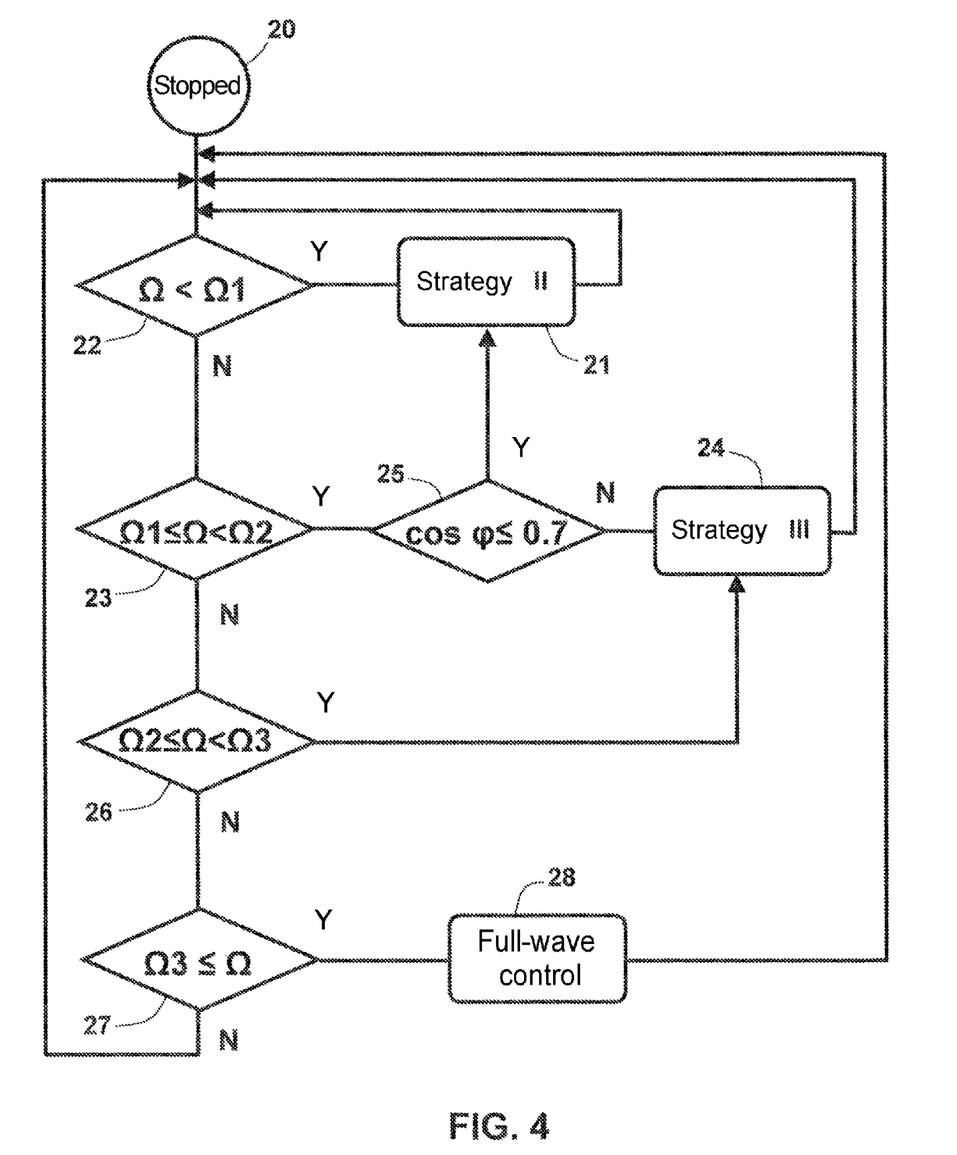
FIG. 4 shows a selection tree for the control strategies shown in FIGS. 2a, 2b, 2c and 2d as a function of the operating points shown in FIG. 3.

FIG. 4 shows the tree for selection of control strategies as a function of the area A, B, C or D.

On starting the machine 1, from stopped 20, the second strategy 21 is selected by a first test 22 for as long as the operating points of the machine 1 are in the first area A.

In this first area A, the advantage of this second strategy 21 is to lower both the rms current in the decoupling capacitor 16 and the losses in the switching elements 9, 13. The switching losses are optimized.

When a second test 23 shows that the operating points of the machine 1 are in the second area B, the second strategy 21 or the third strategy 24 is selected.

The choice 25 between the second strategy 21 and the third strategy 24 depends on the power factor cos φ of the machine 1 relative to a predetermined coefficient preferably equal to 0.7.

In this second area B, the second strategy 21 is selected if the power factor cos φ is less than or equal to 0.7 whereas the third strategy 24 is selected if the power factor cos φ is greater than 0.7.

The reduction of the rms current in the decoupling capacitor 16 is not optimized in this second area B but is large for all the operating points. The switching losses are reduced.

When a third test 26 shows that the operating points of the machine 1 are in the third area C, the third strategy 24 is selected.

In this third area C, the reduction of the rms current in the decoupling capacitor 16 is close to the optimum. The switching losses are also optimized.

When a fourth test 27 shows that the operating points of the machine 1 are in the fourth area D, none of the control strategies in accordance with the invention is selected. As already indicated, full-wave control 28 is therefore used.

As goes without saying, the invention is not limited to only the preferred embodiments described above.

An infinite number of control strategies is possible. The inventors have developed during computer simulations two further examples of vector PWM the parameters of which depend on the operating points of the machine:

Example 1

Two vector PWM are applied using the fourth strategy described above (FIG. 2d):
 blocking in each of the two three-phase inverters INV1, INV2 of the power arm 8, 12 in which the absolute value of the current is maximum and that can be blocked;
 three of the remaining four PWM are offset in accordance with a first set Set1 and a second set Set2 of values of the first, second and third delays Td1, Td2, Td3 indicated in Table I below as a percentage of the PWM period;
 the first set Set1 is chosen if the phase difference φ is between 0 and π/6 (modulo π/3), otherwise the second set Set2 is chosen.

TABLE I

| Delays | Td1 | Td2 | Td3 |
| --- | --- | --- | --- |
| Set1 | 40% | 20% | 40% |
| Set2 | 40% | 30% | 30% |

In this first example, the reduction in the rms current in the decoupling capacitor 16 is the optimum for the operating points of the machine 1 at which the power factor is close to unity (cos φ=+/−1) and/or the coefficient of modulation m is greater than 0.8. For the other operating points the reduction is small.

In this first example, the switching losses for their part are optimized for all the operating points.

In an application of the double three-phase machine 1 in a hybrid vehicle, this first example is advantageously used in the third area C, which typically corresponds to the BOOST function.

Example 2

Two generalized discontinuous PWM (GDPWM) are applied in a similar manner to the third strategy described above (FIG. 2c) with a common delay Td between the first and second inverters INV1, INV2 depending on the phase difference φ and the coefficient of modulation m. A map of this common delay Td (as a percentage of the PWM period) is given in Table II below:

TABLE II

|  | 0° | 30° | 36° | 45° | 60° | 75° | 90° |
| --- | --- | --- | --- | --- | --- | --- | --- |
| 1 | 20% | 20% | 25% | 50% | 50% | 0 | 0 |
| 0.88 | 25% | 10% | 10% | 0 | 0 | 0 | 0 |
| 0.7 | 40% | 0 | 0 | 0 | 40% | 0 | 0 |
| 0.5 | 40% | 20% | 20% | 20% | 25% | 0 | 0 |
| 0.2 | 25% | 25% | 25% | 25% | 25% | 0 | 0 |

In this second example, the reduction of the rms current in the decoupling capacitor 16 is high for the operating points of the machine 1 at which the power factor is close to unity (cos φ=+/−1) and/or the coefficient of modulation m is close to 1 (m=1).

The control device 17 in accordance with the invention advantageously includes a Freescale MPC5643L microcontroller 29 including six independently programmable PWM registers that therefore facilitate implementation of the control strategies described above.

The tests carried out by the inventors show that the control device in accordance with the invention, with the control strategies used, leads to a reduction in the rms current in the decoupling capacitor 16 as high as 63% compared to a basic PWM on a single three-phase machine.

The preferred embodiments of the invention concern a double three-phase machine having an offset angle θ equal to 30°. The same analysis could be performed for double three-phase rotating electrical machines having different offset angles θ.

The control device in accordance with the invention employs microprogrammed logic 29 or alternatively hard-wired logic or a programmed system or even an analog system.

The invention therefore encompasses all possible variant embodiments to the extent that those variants remain within the scope defined by the following claims.

The invention claimed is:

1. A device for controlling a polyphase inverter for supplying power from a direct current source to a double three-phase rotating electrical machine, said device comprising:
 means for generating switching signals controlling switching elements to obtain a reduction of losses in said switching elements and a reduction in an rms current in a decoupling capacitor of said direct current source,
 said double three-phase rotating electrical machine comprising three first phase windings and three second phase windings forming a first three-phase system and a second three-phase system with separate neutral points offset angularly by a predetermined offset angle, and said first and second phase windings being connected to three first and three second power arms, respectively, formed by said switching elements of said polyphase inverter;
 means for storing a set of at least two control strategies determining said switching signals;
 means for acquiring a rotation speed and a power factor of said machine; and means for selecting a current strategy from said set of control strategies as a function of said rotation speed and said power factor.

2. The device as claimed in claim 1 for controlling a polyphase inverter, wherein said set of control strategies includes a strategy comprising applying to said first three-phase system a first centered vectorial pulse width modulation offset by a common delay from a second centered vectorial pulse width modulation with the same period applied to said second three-phase system.

3. The device as claimed in claim 1 for controlling a polyphase inverter, wherein said set of control strategies includes a strategy comprising in applying to said first three-phase system a first vectorial pulse width modulation offset by a common delay from a second vectorial pulse width modulation with the same period applied to said second three-phase system and blocking one of said three first arms and/or one of said three second arms, said common delay being substantially equal to 25% of said period.

4. The device as claimed in claim 3 for controlling a polyphase inverter wherein said strategy is applied if:
   a rotation speed of said machine is less than a first predetermined speed representative of an end of starting of said machine, or
   said rotation speed is between said first predetermined speed and a second predetermined speed representative of an end of functioning at constant torque of said machine, greater than said first predetermined speed, and
   a power factor of said machine is less than or equal to a predetermined coefficient substantially equal to 0.7.

5. The device as claimed in claim 1 for controlling a polyphase inverter, wherein said set of control strategies includes a strategy comprising applying to said first three-phase system a first generalized discontinuous pulse width modulation offset by a common delay from a second generalized discontinuous pulse width modulation with the same period applied to said second three-phase system, said common delay being substantially equal to 30% of said period.

6. The device as claimed in claim 5 for controlling a polyphase inverter wherein said strategy is applied if:
   a rotation speed of said machine is between a first predetermined speed representative of an end of starting of said machine and a second predetermined speed, representative of an end of functioning of said machine at constant torque, greater than said first predetermined speed, and
   a power factor of said machine is greater than a predetermined coefficient substantially equal to 0.7, or said rotation speed is between said second predetermined speed and a third predetermined speed, representative of operation of said machine at constant power greater than said second predetermined speed.

7. The device as claimed in claim 1 for controlling a polyphase inverter, wherein said set of control strategies includes a strategy comprising:
   applying to said first three-phase system a first centered vectorial pulse width modulation and to said second three-phase system a second centered vectorial pulse width modulation having the same period and the same time origin;
   blocking one of said three first arms and one of said three second arms; and
   offsetting the first, second and third delays relative to said time origin of the switching fronts of three of said three first arms and said three second arms that are not blocked.

8. A double three-phase rotating electrical machine comprising an integrated inverter provided with a control device as claimed in claim 1.

* * * * *